(12) United States Patent
Gao et al.

(10) Patent No.: US 11,310,763 B2
(45) Date of Patent: Apr. 19, 2022

(54) METHOD AND DEVICE FOR INDICATING AND RECEIVING PAGING CONTROL INFORMATION, STORAGE MEDIUM, BASE STATION, AND USER EQUIPMENT

(71) Applicant: BEIJING SPREADTRUM HI-TECH COMMUNICATIONS TECHNOLOGY CO., LTD., Beijing (CN)

(72) Inventors: Xinghang Gao, Shanghai (CN); Su Huang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/481,607

(22) PCT Filed: Dec. 27, 2018

(86) PCT No.: PCT/CN2018/124136
§ 371 (c)(1),
(2) Date: Jul. 29, 2019

(87) PCT Pub. No.: WO2019/192218
PCT Pub. Date: Oct. 10, 2019

(65) Prior Publication Data
US 2021/0337504 A1    Oct. 28, 2021

(30) Foreign Application Priority Data

Apr. 3, 2018   (CN) .......................... 201810290992.4

(51) Int. Cl.
*H04W 68/00*   (2009.01)
*H04L 5/00*    (2006.01)
(Continued)

(52) U.S. Cl.
CPC ......... *H04W 68/005* (2013.01); *H04L 1/1819* (2013.01); *H04W 4/90* (2018.02);
(Continued)

(58) Field of Classification Search
CPC ........... H04W 68/005; H04W 72/0446; H04W 72/0453; H04W 4/90; H04W 72/042;
(Continued)

(56) References Cited

U.S. PATENT DOCUMENTS

| 2018/0070332 | A1 | 3/2018 | Chen et al. |
| 2018/0139720 | A1 | 5/2018 | Chen et al. |
| 2018/0317198 | A1* | 11/2018 | Lee ..................... H04W 68/005 |

FOREIGN PATENT DOCUMENTS

| CN | 107251625 A | 10/2017 |
| FM | 107534951 A | 1/2018 |
| WO | 2017079574 A1 | 5/2017 |

OTHER PUBLICATIONS

3GPP TSG RAN WG1 Meeting #92 R1-1802205 Athens, Greece, Feb. 26-Mar. 2, 2018, pp. 1-7, (Year: 2018).*
(Continued)

*Primary Examiner* — Farid Seyedvosoghi
(74) *Attorney, Agent, or Firm* — Cantor Colburn LLP

(57) ABSTRACT

A method and a device for indicating and receiving paging control information, a storage medium, a base station, and a user equipment are provided, and the method for indicating paging control information includes: determining whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator; and configuring a first predetermined bit field in DCI in accordance with a
(Continued)

determined result, wherein the first predetermined bit field includes 2 bits. Embodiments of the present disclosure may support UEs in different states to simultaneously receive and acquire their required paging control information, which saves resources and improves paging efficiency.

15 Claims, 3 Drawing Sheets

(51) Int. Cl.
    *H04W 68/02*     (2009.01)
    *H04W 4/90*     (2018.01)
    *H04L 1/18*     (2006.01)
    *H04W 72/04*     (2009.01)

(52) U.S. Cl.
    CPC ..... *H04W 72/042* (2013.01); *H04W 72/0446* (2013.01); *H04W 72/0453* (2013.01)

(58) Field of Classification Search
    CPC .... H04W 68/02; H04L 1/1819; H04L 1/1896; H04L 1/1822; H04L 5/00; H04L 5/0053
    See application file for complete search history.

(56) References Cited

OTHER PUBLICATIONS

"Paging design in NR," LG Electronics; 3GPP TSG RAN WG1 Meeting #92; Athens, Greece,Feb. 26-Mar. 2, 2018, 7 pages.
International Search Report corresponding to Application No. PCT/CN2018/124136; dated Apr. 3, 2018.

\* cited by examiner it is determined whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator ⸺ S101 a first predetermined bit field is configured in DCI in accordance with a determined result, wherein the first predetermined bit field includes 2 bits ⸺ S102

FIG. 1

METHOD AND DEVICE FOR INDICATING AND RECEIVING PAGING CONTROL INFORMATION, STORAGE MEDIUM, BASE STATION, AND USER EQUIPMENT

CROSS-REFERENCE TO RELATED APPLICATIONS

This application is the national phase of International Application No. PCT/CN2018/124136, filed on Dec. 27, 2018, which claims the benefit of priority to Chinese Patent Application No. 201810290992.4, filed on Apr. 3, 2018, the entire contents of this application are hereby incorporated herein by reference.

TECHNICAL FIELD

The present disclosure relates to a radio communication field, and more particularly, to a method and a device for indicating paging control information, and a method and a device for receiving paging control information, a storage medium, a base station, and a user equipment.

BACKGROUND

In a Long Term Evolution (LTE) technology, a network broadcasts a paging message. The paging message may have following functions: 1) the network transmits a call request to a User Equipment (UE) in a Radio Resource Control Idle (RRC_IDLE) state; 2) the network notifies the UE in the RRC_IDLE state and a UE in a Radio Resource Control Connected (RRC_CONNECTED) state of a system information update; 3) the network notifies the UE to start receiving an Earthquake and Tsunami Warning System (ETWS) primary notification indicator and/or an ETWS secondary notification indicator; 4) the network notifies the UE to start receiving a Commercial Mobile Alert Service (CMAS) notification indicator.

In a New Radio (NR) system of a Fifth-Generation (5G) mobile communications, the paging message is still broadcast. When system information is updated, it is still indicated whether the system information is updated by the paging message. Since there is no need to inform the UE which system information is updated, bits occupied by a system information update indicator field in the paging message are relatively few. In addition, in order to reduce signaling overhead of the network and power consumption of the UE, in the NR system, the 3rd Generation Partnership Project (3GPP) working group determines that the UE in the connected state does not need to decode Physical Downlink Shared Channel (PDSCH). When the paging message carries the system information update notification or the ETWS notification indicator or the CMAS notification indicator, the paging message may be directly carried by a physical downlink control channel (PDCCH). Therefore, downlink control information (DCI) for paging carried by the PDCCH is added with a one-bit short message indicator field to indicate whether the system information is updated. The short message indicator field may also indicate whether the scheduling information for the paging message is carried.

In addition, the 5G NR system proposes a Band Width Part (BWP) concept to support UEs with different bandwidth capabilities. For saving power consumption of the UE, the network may configure a plurality of BWPs for the UE with different bandwidth lengths or numerology according to a bandwidth receiving capability of the UE, and each BWP is within a maximum receiving bandwidth of the UE. The network and/or the UE can adaptively adjust the BWP according to the service requirements and the load of the UE, to save power consumption of the UE, increase a transmission rate, and improve user experience.

After a base station (for example, gNB) configures BWPs for a UE, in order to ensure that the UE can receive the paging message in time, a common search space for monitoring the paging message needs to be configured on each BWP. The UE in the connected state needs to monitor a control resource set corresponding to the common search space at any paging occasions (PO) on an active BWP of the UE, to decode the paging control information. The UE in the idle state or an inactive state needs to monitor a control resource set corresponding to the common search space on an initially activated BWP at the paging occasion corresponding to the UE, to decode the paging control information and receive the paging message.

For a UE in the connected state, since the UE in the connected state is only concerned about whether system information is updated and whether to receive the ETWS notification indicator and the CMAS notification indicator, the paging control information is unnecessary to distinguish UEs. If a control resource set corresponding to a paging common search space on the active BWP configured by the gNB for the UE is the same as a control resource set corresponding to a paging common search space on an initial BWP, when the UE is paged and the system information is updated at the same time, the gNB may only transmit the paging message once in the prior art. In this situation, DCI needs to carry a paging message scheduling information indicator and the system information update notification indicator, and the physical downlink shared channel (PDSCH) carries the paging message of the paged UE. The UE in the connected state does not need to decode the PDSCH, so that the UE in the connected state cannot obtain messages like the system information update. The base station may also transmit the paging message twice, one of which carries only messages like the system information update by the PDCCH, and the other only carries the paging message scheduling information indicator for a list of the paged UE, which not only wastes downlink resources, but also causes the UE in the connected state to ignore the DCI carrying the system information update notification and the like due to receiving the DCI carrying the scheduling paging message firstly.

SUMMARY

Embodiments of the present disclosure may support a UE in a connected state, a UE in an idle state, and a UE in an inactive state to simultaneously receive and acquire their required paging control information and paging message.

Embodiments of the present disclosure provide a method for indicating paging control information, including: determining whether a first type of paging control information and a second type of paging control information are to be carried, wherein the first type of paging control information includes a system information update notification indicator, an ETWS notification indicator, and a CMAS notification indicator, and the second type of paging control information includes a scheduling information indicator for a paging message; and the embodiments of the present disclosure also configure a first predetermined bit field in DCI in accordance with a determined result, wherein the first predetermined bit field includes 2 bits.

In some embodiments, the first predetermined bit field is obtained by extending a short message indicator field; or the first predetermined field includes a downlink configuration index field; or the first predetermined bit field including 1 bit in the downlink configuration index field and the short message indicator field, or the first predetermined bit field including 1 bit in a DCI format indicator field and 1 bit in the short message indicator field.

In some embodiments, when the determined result indicates that the first type of paging control information is carried, the method further includes: configuring a second predetermined bit field in the DCI, wherein the second predetermined bit field includes N bits, wherein N>=3, and N is a positive integer.

In some embodiments, the second predetermined bit field includes higher N bits of a Hybrid Automatic Repeat Request (HARQ) process number indicator field or lower N bits of the HARQ process number indicator field.

In some embodiments, the N bits in the second predetermined bit field are respectively configured to indicate the system information update notification indicator, the ETWS notification indicator, and the CMAS notification indicator.

In some embodiments, a first bit in the first predetermined bit field is configured to indicate whether the first type of paging control information is carried, and a second bit in the first predetermined bit field is configured to indicate whether the second type of paging control information is carried.

In some embodiments, a first bit in the first predetermined bit field is configured to indicate whether both the first type of paging control information and the second type of paging control information are carried; when only one of the first type of paging control information and the second type of paging control information is carried, the second bit in the first predetermined bit field is configured to indicate which paging control information is carried.

Embodiments of the present disclosure provide a method for receiving paging control information, including: receiving DCI; and analyzing a predetermined bit field in the DCI, to determine whether a first type of paging control information and a second type of paging control information are carried in the DCI, wherein the first type of paging control information includes a system information update notification indicator, an ETWS notification indicator, and a CMAS notification indicator, the second type of paging control information includes a scheduling information indicator for a paging message, and the first predetermined bit field includes 2 bits.

In some embodiments, the first predetermined bit field is obtained by extending a short message indicator field; or the first predetermined field includes a downlink configuration index field; or the first predetermined bit field including 1 bit in the downlink configuration index field and the short message indicator field, or the first predetermined bit field including 1 bit in a DCI format indicator field and 1 bit in the short message indicator field.

In some embodiments, the method further including: if the first type of paging control information is carried in the DCI, analyzing a second predetermined bit field, wherein the second predetermined bit field includes N bits, wherein N>=3, and N is a positive integer.

In some embodiments, the second predetermined bit field includes higher N bits of HARQ process number indicator field or lower N bits of the HARQ process number indicator field.

In some embodiments, the N bits in the second predetermined bit field are respectively configured to represent the system information update notification indicator, the ETWS notification indicator, and the CMAS notification indicator.

In some embodiments, a first bit in the first predetermined bit field is configured to indicate whether the first type of paging control information is carried, and a second bit in the first predetermined bit field is configured to indicate whether the second type of paging control information is carried.

In some embodiments, a first bit in the first predetermined bit field is configured to indicate whether both the first type of paging control information and the second type of paging control information are carried; when only one type of paging control information is carried, the second bit in the first predetermined bit field is configured to indicate which paging control information is carried.

Embodiments of the present disclosure provide a device for indicating a paging control information, including: a determining circuitry, configured to determine whether a first type of paging control information and a second type of paging control information are to be carried, wherein the first type of paging control information includes a system information update notification indicator, an ETWS notification indicator, and a CMAS notification indicator, and the second type of paging control information includes a scheduling information indicator for paging message; and a first configuring circuitry, configured to configure a first predetermined bit field in DCI in accordance with a determined result, wherein the first predetermined bit field includes 2 bits.

In some embodiments, the first predetermined bit field is obtained by extending a short message indicator field; or the first predetermined field including a downlink configuration index field; or the first predetermined bit field including 1 bit in the downlink configuration index field and the short message indicator field, or the first predetermined bit field including 1 bit in a DCI format indicator field and 1 bit in the short message indicator field.

In some embodiments, the device further includes: a second configuring circuitry, when the determined result indicating that the first type of paging control information is carried, configured to configure a second predetermined bit field in the DCI, wherein the second predetermined bit field includes N bits, wherein N>=3, and N is a positive integer.

In some embodiments, the second predetermined bit field includes higher N bits of a HARQ process number indicator field or lower N bits of the HARQ process number indicator field.

In some embodiments, the N bits in the second predetermined bit field are respectively configured to indicate the system information update notification indicator, the ETWS notification indicator, and the CMAS notification indicator.

In some embodiments, a first bit in the first predetermined bit field is configured to indicate whether the first type of paging control information is carried, and a second bit in the first predetermined bit field is configured to indicate whether the second type of paging control information is carried.

In some embodiments, a first bit in the first predetermined bit field is configured to indicate whether both the first type of paging control information and the second type of paging control information are carried; when only one type of paging control information is carried, the second bit in the first predetermined bit field is configured to indicate which paging control information is carried.

Embodiments of the present disclosure provide a device for receiving paging control information, including: a receiving circuitry, configured to receiving DCI; and a first analyzing circuitry, configured to analyze a predetermined bit field in the DCI, to determine whether a first type of paging control information and a second type of paging control information are carried in the DCI, wherein the first type of paging control information includes a system information update notification indicator, an ETWS notification indicator, and a CMAS notification indicator, the second type of paging control information includes a paging message scheduling information indicator, and the first predetermined bit field includes 2 bits.

In some embodiments, the first predetermined bit field is obtained by extending a short message indicator field; or the first predetermined field includes a downlink configuration index field; or the first predetermined bit field includes 1 bit in the downlink configuration index field and the short message indicator field, or the first predetermined bit field includes' bit in a DCI format indicator field and 1 bit in the short message indicator field.

In some embodiments, the device further includes: a second analyzing circuitry, if the first type of paging control information being carried in the DCI, configured to analyze a second predetermined bit field, wherein the second predetermined bit field includes N bits, wherein N>=3, and N is a positive integer.

In some embodiments, the second predetermined bit field includes higher N bits of a HARQ process number indicator field or lower N bits of the HARQ process number indicator field.

In some embodiments, the N bits in the second predetermined bit field are respectively configured to represent the system information update notification indicator, the ETWS notification indicator, and the CMAS notification indicator.

In some embodiments, a first bit in the first predetermined bit field is configured to indicate whether the first type of paging control information is carried, and a second bit in the first predetermined bit field is configured to indicate whether the second type of paging control information is carried.

In some embodiments, a first bit in the first predetermined bit field is configured to indicate whether both the first type of paging control information and the second type of paging control information are carried; when only one type of paging control information is carried, the second bit in the first predetermined bit field is configured to indicate which paging control information is carried.

Embodiments of the present disclosure provide a storage medium, storing computer instructions, wherein once the computer instructions are executed, the method for indicating paging control information or the method for receiving paging control information is performed.

Embodiments of the present disclosure provide a base station, including a memory and a processor, wherein the memory stores computer instructions executable on the processor, and the processor executes the method for indicating paging control information when executing the computer instructions.

Embodiments of the present disclosure provide a user equipment, including a memory and a processor, wherein the memory stores computer instructions executable on the processor, and the processor executes the method for receiving paging control information when executing the computer instructions. The user equipment may be a user equipment for 5G communication.

Embodiments of the present disclosure have the following benefits.

Embodiments of the present disclosure provide a method for indicating paging control information, including: determining whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator; and configuring a first predetermined bit field in DCI in accordance with a determined result, wherein the first predetermined bit field includes 2 bits. Embodiments of the present disclosure may indicate whether the first type of paging control information and the second type of paging control information occur simultaneously, and support the UE in the connected state, the UE in the idle state and the UE in the inactive state to simultaneously receive and acquire their required paging control information, which saves resources and improves paging efficiency.

Further, the N bits in the second predetermined bit field are configured to respectively represent the system information update notification indicator, the ETWS notification indicator, and the CMAS notification indicator. Embodiments of the present disclosure may use an idle bit field existing in the DCI to determine whether the system information is updated, and whether there is an ETWS message and a CMAS message, which saves downlink control resources.

BRIEF DESCRIPTION OF THE DRAWINGS

FIG. 1 schematically illustrates a flow diagram of a method for indicating paging control information according to an embodiment of the present disclosure;

DETAILED DESCRIPTION

Figure 2:
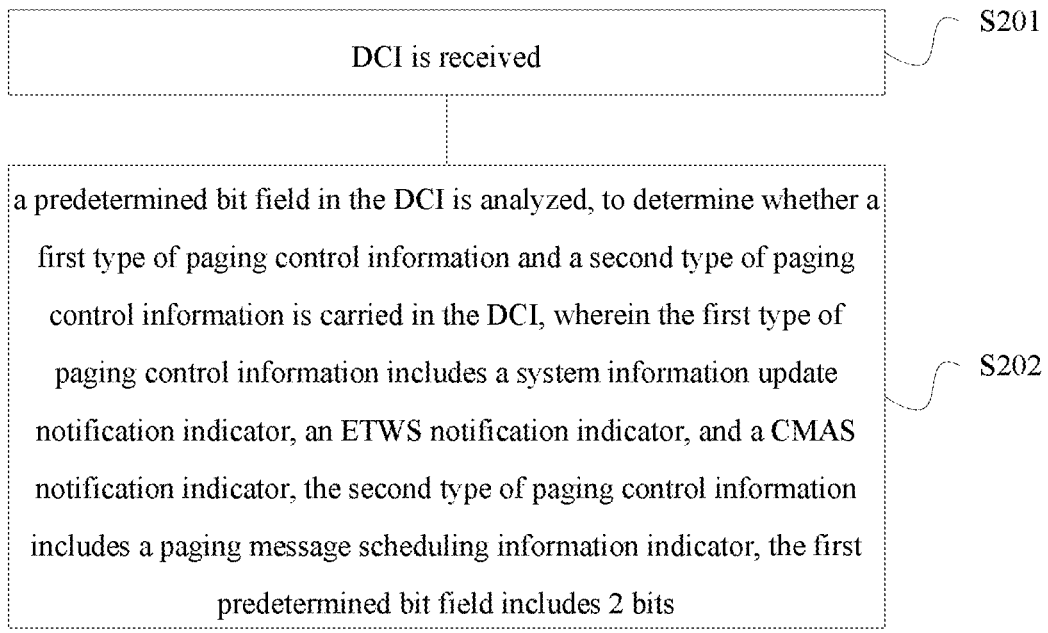
FIG. 2 schematically illustrates a flow diagram of a method for receiving paging control information according to an embodiment of the present disclosure.

Those skilled in the art may understand that, as shown in the background, the prior art cannot support a UE in a connected state to receive messages such as a system information update, at the same time, a UE in an idle state and a UE in an inactive state to receive paging message scheduling information.

With research and analysis, inventors of the present disclosure found that an LTE system places a UE Identifier (ID) of a paged UE and the indicator whether there is a system information update in a same paging message. The Scheduling information of a paging message is indicated by a PDCCH scrambled by a Paging-Radio Network Temporary Identity (P-RNTI). The UE needs to monitor the PDCCH scrambled by the P-RNTI on a corresponding PO firstly, and after receiving DCI, the UE receives the paging message on the PDSCH by using a scheduling resource indicated by the DCI.

Specifically, the LTE network transmits paging control information through the DCI, and the UE determines the PO according to its UE ID. The UE only monitors the paging control information on the corresponding PO. When the LTE network needs to transmit the downlink data (i.e., a call) to the UE in the idle state or the inactive state, a mobile management entity (MME) transmits the paging message to all base stations in the Tracking Area (TA) registered by the UE, and the paging message notifies the paged UE of the UE ID and a value required for a calculation for a Paging Frame (PF) of the UE by the base station. Thereafter, the base station transmits a paging message including information of a paging record table (PagingRecordList) through the PDSCH to page the UE.

After receiving the paging message, the UE in the idle state or the UE in the inactive (RRC_INACTIVE) state reads the UE ID of the paged UE in the paging record list. If the UE finds that the paging record list includes its UE ID, the UE initiates an uplink random access procedure, completes an RRC connection establishment, and receives the downlink data (i.e., the call). If the paging record list does not include its UE ID, the UE discards the received paging message and keeps a sleep state.

For the UE in the connected state, the UE only needs to confirm whether the paging message includes a system information update indicator field. If the system information update indicator field is included, it is confirmed that the system information is updated, and the UE receives the updated system information at the beginning of the system information modification period. If the system information update indicator field is not included, it is confirmed that the system information has not been updated.

In a 5G NR system, the paging control information is still transmitted to the UE through the PDCCH scrambled by the P-RNTI. If the system information changes, the NR base station (i.e., gNB) may send the DCI carrying information such as system information update on each paging occasion. If there is a paged UE, the gNB needs to transmit the downlink control information carrying a paging message scheduling information indicator at the paging occasion corresponding to the paged UE.

TABLE 1

| DCI field | Bit length |
|---|---|
| DCI format indicator | 1 |
| Frequency-domain resource configuration | $\lceil \log_2(N_{RB}^{DL,\ BWP}(N_{RB}^{DL,\ BWP} + 1)/2) \rceil$ |
| Time-domain resource configuration | X |
| Mapping of virtual resource block and physical resource block | 1 |
| Modulation coding format | 5 |
| New data indicator | 1 |
| Redundancy Version | 2 |
| HARQ process number | 4 |
| Downlink configuration index | 2 |
| Scheduling PUCCH transmit power control | [2] |
| PUCCH resource indicator | 3 |
| PDSCHHARQ feedback timing indicator | [3] |
| Short message indicator | 1 |

In the current 5G technology, the DCI format for carrying the paging control information is as shown in Table 1. The short message indicator field is set at the end of the DCI and has only 1 bit. Since the short message indicator field has only 1 bit, the short message indicator may support the UE in the connected state to receive information such as the system information update, or support the UE in the idle state and the UE in the inactive state to receive the paging message scheduling information indicator. Therefore, the short message indicator cannot support the UE in the connected state, the UE in the idle state and the UE in the inactive state to receive their required paging control information respectively at the same time.

Embodiments of the present disclosure provide a method for indicating paging control information, including: determining whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator; and configuring a first predetermined bit field in DCI in accordance with a determined result, wherein the first predetermined bit field includes 2 bits. Embodiments of the present disclosure may indicate whether the first type of paging control information and the second type of paging control information occur simultaneously, and support the UE in the connected state, the UE in the idle state and the UE in the inactive state to simultaneously receive and acquire their required paging control information, which saves resources and improves paging efficiency.

In order that the above objects, characteristics and advantages of the present disclosure become more apparent, embodiments of the present disclosure are described in detail with reference to the drawings.

FIG. 1 schematically illustrates a flow diagram of a method for indicating paging control information according to an embodiment of the present disclosure. The method is applicable on a network side. For example, the method may be performed by a base station. Referring to FIG. 1, the method for indicating paging control information may include following steps.

In S101, it is determined whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator.

In S102, a first predetermined bit field is configured in DCI in accordance with a determined result, wherein the first predetermined bit field includes 2 bits.

Specifically, a NR base station (i.e., gNB) transmits the DCI carrying the paging control information to the UE before transmitting the paging message. The DCI is scrambled by the P-RNTI.

More specifically, in step S101, the gNB may determine the paging control information carried by the DCI. For example, the gNB may carry the first type of paging control information, or the second type of paging control information, or both the first type of paging control information and the second type of paging control information.

The first type of paging control information may include the system information update notification indicator, the ETWS notification indicator, and the CMAS notification indicator. The second type of paging control information may include the paging message scheduling information indicator.

More specifically, if the system information is updated, the gNB needs to carry the system information update notification indicator in the DCI to inform the UE to receive the updated system information; if there is ETWS information and/or CMAS information, the gNB needs to carry the ETWS notification indicator and/or the CMAS notification indicator in the DCI.

In S102, a first predetermined bit field is configured in DCI in accordance with a determined result, wherein the first predetermined bit field includes 2 bits.

Specifically, the first predetermined bit field may be obtained by extending a conventional 1-bit short message indicator field in the DCI. That is, the short message indicator field is 1 bit in the prior art. In some embodiment, the 1-bit short message indicator field is extended to 2 bits, so that the following multiple states can be represented by different configurations: both the first type of paging control information and the second type of paging control information are carried, only the first type of paging control information is carried, and only the second type of paging control information is carried.

Further, 1 bit (e.g., the former bit) of the first predetermined bit field (e.g., the former bit) may be configured to indicate whether the first type of paging control information is carried, and the other bit (e.g., the latter bit) in the first predetermined bit field may be used to indicate whether the second type of paging control information is carried.

In some embodiments, a bit value of the first predetermined bit field may be set to 00 or 11. When the bit value is 00 or 11, it indicates that both the first type of paging control information and the second type of paging control information are carried in the DCI.

In some embodiments, a first bit (e.g., the former bit) in the first predetermined bit field may be configured to indicate whether both the first type of paging control information and the second type of paging control information are carried. When only one of the first type of paging control information and the second type of paging control information is carried, a second bit (e.g., the latter bit) in the first predetermined bit field is configured to indicate which paging control information is carried. When the first bit indicates that both the first type of paging control information and the second type of paging control information are carried, a bit value of the second bit may be ignored whether the bit value is 0 or 1.

In some embodiment, when the bit value of the former bit in the first predetermined bit field is 1, it indicates that both the first type of paging control information and the second type of paging control information are carried. When the bit value of the former bit is 0, it indicates that only one of the two types of paging control information is carried. For a case where only one of two types of paging control information is carried, when the latter bit is 0, it indicates that the first type of paging control information is carried, and when the latter bit is 1, it indicates that the second type of paging control information is carried. With this arrangement, in a case where the bit value of the first predetermined bit field is set to 01, since the former bit is "0", it indicates that only one of the first type of paging control information and the second type of paging control information is carried. Further, since the latter bit is "1", it indicates that the second type of paging control information is carried. Similarly, with this arrangement, in the case where the bit value of the first predetermined bit field is set to 10 or 11, since the former bit is "1", it indicates that both the first type of paging control information and the second type of paging control information are carried, and the bit value of the latter bit is ignored.

Those skilled in the art understand that bit values of the first predetermined bit field for the first type of paging control information and/or the second type of paging control information may have more embodiments, which are not described herein. For example, in the above example, the former bit and the latter bit in the first predetermined bit field may be interchanged, that is, the latter bit is configured to indicate whether both the first type of paging control information and the second paging are carried, or when only one of the first type of paging control information and the second type of paging control information is carried, the former bit is configured to indicate which paging control information is carried.

Further, when the first type of paging control information is carried, in some embodiments, the second predetermined bit field may be configured in the DCI to indicate which one or more of the system information update notification indicator, the ETWS notification indicator, the CMAS notification indicator and other notification are carried, wherein the second predetermined bit field may include N bits, N>=3, and N is a positive integer. Further, when the paging control information is carried in the DCI, a 4-bit HARQ process number indicator field in the DCI is idle, so N bits in the 4-bit HARQ process number may be used as the second predetermined bit field.

Specifically, when the first predetermined bit field indicates that the first type of paging control information only includes the system information update notification indicator, the ETWS notification indicator, and the CMAS notification indicator, higher 3 bits or lower 3 bits of the HARQ process number indicator field are used as the second predetermined bit field. The 3 bits respectively represent the system information update notification indicator, the ETWS notification indicator, and the CMAS notification indicator.

In some embodiments, referring to Table 2, in a selected HARQ process number indicator field, higher 3 bits of the HARQ process number indicator field may be selected to carry the system information update notification indicator, the ETWS notification indicator, and the CMAS notification indicator. Specifically, a bit mapping manner may be used for indication. For example, the first highest bit is configured to indicate the system information update notification indicator, the second highest bit is configured to indicate the ETWS notification indicator, and the third highest bit is configured to indicate the CMAS notification indicator.

In some embodiments, referring to Table 2, lower 3 bits of the HARQ process number indicator field may be selected to carry the system information update notification indicator, the ETWS notification indicator, and the CMAS notification indicator. Specifically, the bit mapping manner may be used for indication. For example, the first lowest bit is configured to indicate the system information update notification indicator, the second lowest bit is configured to indicate the ETWS notification indicator, and the third lowest bit is configured to indicate the CMAS notification indicator.

Those skilled in the art understand that the first type of paging control information may include other notification information besides the system information update notification indicator, the ETWS notification indicator, and the CMAS notification indicator, so that all bits in the HARQ process number may be configured to indicate the first type of paging control information. For example, when the first type of paging control information includes more than four types of notification information, it may also be indicated by using a 2-bit downlink configuration index field in the conventional DCI.

Further, the first predetermined bit field may be set in front of the time-domain resource field and the frequency-domain resource field in the DCI.

TABLE 2

| DCI field | Bit length |
| --- | --- |
| DCI format indicator | 1 |
| First predetermined bit field | 2 |
| Frequency-domain resource configuration | $\lceil \log_2(N_{RB}^{DL,\,BWP}(N_{RB}^{DL,\,BWP} + 1)/2 \rceil$ |
| Time-domain resource configuration | X |
| Mapping of virtual resource | 1 |

TABLE 2-continued

| DCI field | Bit length |
|---|---|
| block and physical resource block | |
| Modulation coding format | 5 |
| New data indicator | 1 |
| Redundancy Version | 2 |
| HARQ process number (Second predetermined bit field) | 4 (for example, including the system information update notification indicator, the ETWS notification indicator, and the CMAS notification indicator) |
| Downlink configuration index | 2 |
| Scheduling PUCCH transmit power control | [2] |
| PUCCH resource indicator | 3 |
| PDSCHHARQ feedback timing indicator | [3] |

Specifically, referring to Table 2, the first predetermined bit field obtained by extending the short message indicator field may be set in front of the frequency-domain resource configuration field and the time-domain resource configuration field in the DCI.

Further, resource allocation information in the paging message may be set in the frequency-domain resource configuration field and the time-domain resource configuration field in the DCI in accordance with the existing manner.

In some embodiments, the first predetermined bit field may be a 2-bit downlink configuration index field included in the DCI. Specifically, according to a downlink configuration index field, the gNB may represent that both the first type of paging control information and the second type of paging control information are carried, or only the first type of paging control information is carried or only the second type of paging control information is carried. For a specific bit value setting manner, reference may be made to the bit value setting manner of the first predetermined bit field obtained by extending the 1-bit short message indicator field in the DCI, which is not described in detail herein.

Further, referring to Table 3, if the downlink configuration index field is used as the first predetermined bit field, the short message indicator bit field in the DCI may be omitted to save downlink control resources.

TABLE 3

| DCI field | Bit length |
|---|---|
| DCI format indicator | 1 |
| Frequency-domain resource configuration | $\lceil \log_2(N_{RB}^{DL,\ BWP}(N_{RB}^{DL,\ BWP} + 1)/2) \rceil$ |
| Time-domain resource configuration | X |
| Mapping of virtual resource block and physical resource block | 1 |
| Modulation coding format | 5 |
| New data indicator | 1 |
| Redundancy Version | 2 |
| HARQ process number | 4 (for example, including the system information update notification indicator, the ETWS notification indicator, and the CMAS notification indicator) |
| First predetermined bit field (Downlink configuration index) | 2 |
| Scheduling PUCCH transmit power control | [2] |

TABLE 3-continued

| DCI field | Bit length |
|---|---|
| PUCCH resource indicator | 3 |
| PDSCHHARQ feedback timing indicator | [3] |

Further, when the first type of paging control information is carried, the second predetermined bit field in the DCI may be configured, and the second predetermined bit field includes N bits, where N>=3, and N is a positive integer. When the first type of paging control information includes only three types of notification, the second predetermined bit field may be configured to indicate whether the system information update notification indicator, the ETWS notification indicator, and the CMAS notification indicator are carried respectively. Referring to Table 3, when the first predetermined bit field indicates that the first type of paging control information only includes three types of notification, higher 3 bits or the lower 3 bits of the HARQ process number indicator field in the DCI may be used as the second predetermined bit field to indicate the system information update notification indicator, the ETWS notification indicator, and the CMAS notification indicator respectively.

In some embodiments, 1 bit is configured to indicate the system information update notification indicator, another 1 bit is configured to indicate the ETWS notification indicator, and the remained 1 bit is configured to indicate the CMAS notification indicator. Embodiments may refer to Table 3, which are not described herein.

In some embodiments, referring to Table 4, the first predetermined bit field may be the 1-bit short message indicator field in combination with in a higher 1 bit or a lower 1 bit of the downlink configuration index field or in combination with the 1-bit DCI format indicator field. Therefore, the first predetermined bit field is still 2 bits. Those skilled in the art understand that the 1-bit short message indicator field can be set in front of the frequency-domain resource configuration field and the time-domain resource configuration field in the DCI.

Specifically, the short message indicator field in the first predetermined bit field may be configured to indicate whether the first type of paging control information is carried, and a higher 1 bit or a lower 1 bit of the downlink configuration index field or the 1-bit DCI format indicator field may be configured to indicate whether the second type of paging control information is carried.

In some embodiments, by the 1 bit in the downlink configuration index field or the 1-bit DCI format indicator field, the first predetermined bit field indicates that the DCI carries both the first type of paging control information and the second type of paging control information, or carries only one of the first type of paging control information and the second type of paging control information. When only one of the first type of paging control information and the second type of paging control information is carried, the short message indicator field in the first predetermined bit field may be configured to indicate which one of the paging control information is carried.

In some embodiments, by the short message indicator field, the first predetermined bit field indicates that the DCI carries both the first type of paging control information and the second type of paging control information, or carries only one of the first type of paging control information and the second type of paging control information. When only one of the first type of paging control information and the second type of paging control information is carried, the 1 bit in the downlink configuration index field or the 1-bit DCI format indicator field in the first predetermined bit field may be configured to indicate which one of the paging control information is carried.

TABLE 4

| DCI field | Bit length |
| --- | --- |
| DCI format indicator (for forming the first predetermined bit field) | 1 |
| Short message indicator | 1 |
| Frequency-domain resource configuration | $\lceil \log_2(N_{RB}^{DL, BWP}(N_{RB}^{DL, BWP} + 1)/2) \rceil$ |
| Time-domain resource configuration | X |
| Mapping of virtual resource block and physical resource block | 1 |
| Modulation coding format | 5 |
| New data indicator | 1 |
| Redundancy Version | 2 |
| HARQ process number(the second predetermined bit field) | 4 (including the system information update notification indicator, the ETWS notification indicator, and the CMAS notification indicator) |
| Downlink configuration index (1 bit for forming the first predetermined bit field) | 2 |
| Scheduling PUCCH transmit power control | [2] |
| PUCCH resource indicator | 3 |
| PDSCHHARQ feedback timing indicator | [3] |

When it is taken as an example that the 1 bit in the downlink configuration index field or the 1-bit DCI format indicator field is configured to indicate that the DCI carries both the first type of paging control information and the second type of paging control information, or carries one of the first type of paging control information and the second type of paging control information, a manner for setting a bit value of the first predetermined bit field is described hereinafter.

Specifically, when 1 bit in a higher 1 bit or a lower 1 bit in the downlink configuration index field or the 1-bit DCI format indicator field is set to 0, it is indicated that both the first type of paging control information and the second type of paging control information are carried in the paging control information. On the contrary, only the first type of paging control information is carried or only the second type of paging control information is carried. Settings of specific bit value can be varied as needed, for example, 0 and 1 may be interchanged.

Further, when the paging control information indicates that only the first type of paging control information is carried or only the second type of paging control information is carried, the short message indicator field may be used for the indication, otherwise the short message indication could be ignored.

In some embodiment, bit 0 may be configured to indicate that only the first type of paging control information is carried; and bit 1 may also be configured to indicate that only the second type of paging control information is carried. Those skilled in the art understand, in some embodiments, different bit values may be configured to indicate whether the first type of paging control information or the second type of paging control information is carried.

Further, referring to Table 4, when the first predetermined bit field indicates that the first type of paging control information includes only the system information update notification indicator, the ETWS notification indicator, and the CMAS notification indicator, higher 3 bits or lower 3 bits of the HARQ process number indicator field in the DCI may be used as the second predetermined bit field, to indicate the system information update notification indicator, the ETWS notification indicator, and the CMAS notification indicator respectively.

In the 3 bits, 1 bit is configured to indicate the system information update notification indicator, another 1 bit is configured to indicate the ETWS notification indicator indication, and the remained 1 bit is configured to indicate the CMAS notification indicator. More details may be referred to Table 2, which are not described herein.

Further, as shown in Table 4, the short message indicator field may be set in front of the frequency-domain resource configuration field and the time-domain resource configuration field in the DCI.

Further, resource allocation information in the paging message may be set in the frequency-domain resource configuration field and the time-domain resource configuration field in the DCI in accordance with the existing manner.

Those skilled in the art understand that a number of bits of the second predetermined bit field is related to a number of notifications included in the first type of paging control information, and increases as the number of included notifications increases. Reference may be made to the previous part, which is not described in detail herein.

FIG. 2 schematically illustrates a flow diagram of a method for receiving paging control information according to an embodiment of the present disclosure, wherein the method is applicable on a UE side, for example, the method may be performed by the UE. Referring to FIG. 2, the method for receiving paging control information may include following steps.

In S201, DCI is received.

In S202, a predetermined bit field in the DCI is analyzed, to determine whether a first type of paging control information and a second type of paging control information is carried in the DCI, wherein the first type of paging control information includes a system information update notification indicator, an ETWS notification indicator, and a CMAS notification indicator, the second type of paging control information includes a paging message scheduling information indicator, the first predetermined bit field includes 2 bits.

Specifically, in S201, the UE may receive the DCI message transmitted by the PDCCH from the network side.

In S202, the UE may demodulate and decode the DCI. If the DCI includes the first predetermined bit field, the UE determines whether the first type of paging control information and the second type of paging control information is carried in the DCI after analyzing the first predetermined bit field.

Further, the first predetermined bit field is obtained by extending a short message indicator field; or the first predetermined field includes a downlink configuration index field; or the first predetermined bit field includes 1 bit in the downlink configuration index field and the short message indicator field, or the first predetermined bit field includes 1 bit in a DCI format indicator field and 1 bit in the short message indicator field.

Further, if the first type of paging control information is carried in the DCI, the UE analyzes a second predetermined bit field, wherein the second predetermined bit field includes N bits, wherein N>=3, and N is a positive integer.

Further, the second predetermined bit field includes higher N bits of a HARQ process number indicator field or lower N bits of the HARQ process number indicator field. Further, the N bits in the second predetermined bit field are respectively configured to indicate the system information update notification, the ETWS notification indicator, and the CMAS notification indicator.

Further, a first bit in the first predetermined bit field is configured to indicate whether the first type of paging control information is carried, and a second bit in the first predetermined bit field is configured to indicate whether the second type of paging control information is carried.

Further, a first bit in the first predetermined bit field is configured to indicate whether both the first type of paging control information and the second type of paging control information are carried. When only one of the first type of paging control information and the second type of paging control information is carried, the second bit in the first predetermined bit field is configured to indicate which paging control information is carried.

Those skilled in the art understand that the S201 and the S202 correspond to the method for indicating the paging control information in the embodiment shown in FIG. 1, and the two methods are mutually complementary in specific implementation principles and logic. Therefore, the method for receiving the paging control information on the UE side may refer to the related description of embodiments shown in FIG. 1, which is not described in detail herein.

Embodiments of the present disclosure may support the UE in the connected state, the UE in the idle state, and the UE in the inactive state to simultaneously receive and acquire the their required paging messages, which is beneficial to saving resources and improving paging efficiency.

Figure 3:
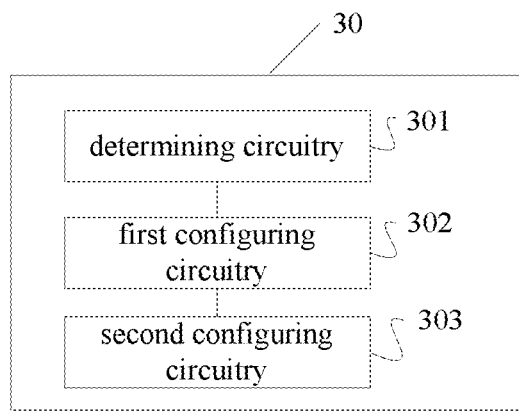
FIG. 3 schematically illustrates a structural diagram of a device for indicating paging control information according to an embodiment of the present disclosure.

FIG. 3 schematically illustrates a structural diagram of a device for indicating paging control information according to an embodiment of the present disclosure. Referring to FIG. 3, the device for indicating paging control information 30 (simplified as an indicating device 30 in the following) may be used in a network side, to realize the method for indicating paging control information shown as FIG. 1.

Specifically, the indicating device 30 may include a determining circuitry 301 and a first configuring circuitry 302.

More specifically, the determining circuitry 301 configured to determine whether a first type of paging control information and a second type of paging control information are to be carried, wherein the first type of paging control information includes a system information update notification indicator, an ETWS notification indicator, and a CMAS notification indicator, and the second type of paging control information includes a paging message scheduling information indicator; and the first configuring circuitry 302 is configured to configure a first predetermined bit field in DCI in accordance with a determined result, wherein the first predetermined bit field includes 2 bits.

Further, the first predetermined bit field is obtained by extending a short message indicator field; or the first predetermined field includes a downlink configuration index field; or the first predetermined bit field includes 1 bit in the downlink configuration index field and the short message indicator field, or the first predetermined bit field includes 1 bit in a DCI format indicator field and 1 bit in the short message indicator field.

Further, the indicating device 30 further includes: a second configuring circuitry may further includes a second configuring circuitry 303.

Specifically, when the determined result indicating that the first type of paging control information is carried, the second configuring circuitry is configured to configure a second predetermined bit field in the DCI, wherein the second predetermined bit field includes N bits, wherein N>=3, and N is a positive integer.

Further, the second predetermined bit field includes higher N bits of a HARQ process number indicator field or lower N bits of the HARQ process number indicator field.

Further, the N bits in the second predetermined bit field are respectively configured to indicate the system information update notification indicator, the ETWS notification indicator, and the CMAS notification indicator.

Further, a first bit in the first predetermined bit field is configured to indicate whether the first type of paging control information is carried, and a second bit in the first predetermined bit field is configured to indicate whether the second type of paging control information is carried.

Further, a first bit in the first predetermined bit field is configured to indicate whether both the first type of paging control information and the second type of paging control information are carried; when only one of the first type of paging control information and the second type of paging control information is carried, the second bit in the first predetermined bit field is configured to indicate which paging control information is carried.

More details about an operating principle and an operating manner of the indicating device 30 may be referred to the related description about FIG. 1, which are not described in detail herein.

Figure 4:
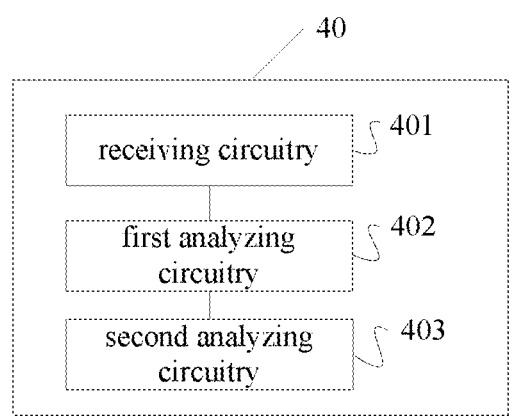
FIG. 4 schematically illustrates a structural diagram of a device for receiving paging control information according to an embodiment of the present disclosure.

FIG. 4 schematically illustrates a structural diagram of a device for receiving paging control information 40 according to an embodiment of the present disclosure, the device may be used in a user equipment side. The device for receiving paging control information 40 may realize the method for receiving paging control information shown in FIG. 2.

Specifically, a receiving device for receiving paging control information 40 may include: a receiving circuitry 401 and a first analyzing circuitry 402.

More specifically, the receiving circuitry 401 is configured to receiving DCI; and the first analyzing circuitry 402 is configured to analyze a predetermined bit field in the DCI, to determine whether a first type of paging control information and a second type of paging control information are carried in the DCI, wherein the first type of paging control information includes a system information update notification indicator, an ETWS notification indicator, and a CMAS notification indicator, the second type of paging control information includes a paging message scheduling information indicator, and the first predetermined bit field includes 2 bits.

Further, the first predetermined bit field is obtained by extending a short message indicator field; or the first predetermined field includes a downlink configuration index field; or the first predetermined bit field includes 1 bit in the downlink configuration index field and the short message indicator field, or the first predetermined bit field includes 1 bit in a DCI format indicator field and 1 bit in the short message indicator field.

Further, the device further includes: a second analyzing circuitry, if the first type of paging control information being carried in the DCI, configured to analyze a second predetermined bit field, wherein the second predetermined bit field includes N bits, wherein N>=3, and N is a positive integer.

Further, the second predetermined bit field includes higher N bits of a HARQ process number indicator field or lower N bits of the HARQ process number indicator field.

Further, the N bits in the second predetermined bit field are respectively configured to represent the system information update notification indicator, the ETWS notification indicator, and the CMAS notification indicator.

Further, a first bit in the first predetermined bit field is configured to indicate whether the first type of paging control information is carried, and a second bit in the first predetermined bit field is configured to indicate whether the second type of paging control information is carried.

Further, a first bit in the first predetermined bit field is configured to indicate whether both the first type of paging control information and the second type of paging control information are carried; when only one of the first type of paging control information and the second type of paging control information is carried, the second bit in the first predetermined bit field is configured to indicate which paging control information is carried.

Further, More details about an operating principle and an operating manner of the receiving device for receiving paging control information 40 may be referred to the related description about FIG. 2, which are not described in detail herein.

Further, embodiments of the present disclosure provide a storage medium, storing computer instructions, wherein once the computer instructions are executed, the method for indicating paging control information shown in FIG. 1 or the method for receiving paging control information shown in FIG. 2 is performed. In some embodiments, the storage medium may include a computer readable storage medium such as a non-volatile memory or a non-transitory memory. The computer readable storage medium may include a Read-Only memory (ROM), a Random Access Memory (RAM), a magnetic disk or an optical disk.

Further, embodiments of the present disclosure provide a base station, including a memory and a processor, wherein the memory stores computer instructions executable on the processor, and the processor executes the method for indicating paging control information shown in FIG. 1 when executing the computer instructions. Specifically, the base station may a NR gNB.

Embodiments of the present disclosure provide a user equipment, including a memory and a processor, wherein the memory stores computer instructions executable on the processor, and the processor executes the method for receiving paging control information shown in FIG. 2 when executing the computer instructions. Specifically, the user equipment may support 5G NR communication.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A method for indicating paging control information, comprising:
    determining whether a first type of paging control information and a second type of paging control information are to be carried, wherein the first type of paging control information comprises a system information update notification indicator, an earthquake and tsunami warning system (ETWS) notification indicator, and a commercial mobile alert service (CMAS) notification indicator, and the second type of paging control information comprises a paging message scheduling information indicator; and
    configuring a first predetermined bit field in downlink control information (DCI) in accordance with a determined result, wherein the first predetermined bit field comprises 2 bits,
    wherein a first bit in the first predetermined bit field is configured to indicate whether both the first type of paging control information and the second of paging control information are carried; and
    based on only one of the first type of paging control information and the second type of paging control information being carried, a second bit in the first predetermined bit field is configured to indicate which paging control information is carried.

2. The method according to claim 1, wherein the first predetermined bit field is obtained by extending a short message indicator field; or the first predetermined field comprises a downlink configuration index field; or the first predetermined bit field comprises 1 bit in the downlink configuration index field and the short message indicator field, or the first predetermined bit field comprises 1 bit in a DCI format indicator field and 1 bit in the short message indicator field.

3. The method according to claim 1, wherein based on the first type of paging control information being carried, the method further comprises:
    configuring a second predetermined bit field in the DCI, wherein the second predetermined bit field comprises N bits, wherein N>=3, and N is a positive integer.

4. The method according to claim 3, wherein the second predetermined bit field comprises higher N bits of a hybrid automatic repeat request (HARQ) process number indicator field or lower N bits of the HARQ process number indicator field.

5. The method according to claim 3, wherein the N bits in the second predetermined bit field are respectively configured to indicate the system information update notification indicator, the ETWS notification indicator, and the CMAS notification indicator.

6. A method for receiving paging control information, comprising:
    receiving downlink control information (DCI); and
    analyzing a predetermined bit field in the DCI, to determine whether a first type of paging control information and a second type of paging control information are carried in the DCI, wherein the first type of paging control information comprises a system information update notification indicator, an earthquake and tsunami warning system (ETWS) notification indicator, and a commercial mobile alert service (CMAS) notification indicator, the second type of paging control information comprises a paging message scheduling information indicator, and the first predetermined bit field comprises 2 bits,
    wherein a first bit in the first predetermined bit field is configured to indicate whether both the first type of paging control information and the second of paging control information are carried; and
    based on only one of the first type of paging control information and the second type of paging control information being carried, a second bit in the first predetermined bit field is configured to indicate which paging control information is carried.

7. The method according to claim 6, wherein the first predetermined bit field is obtained by extending a short message indicator field; or the first predetermined field comprises a downlink configuration index field; or the first predetermined bit field comprises 1 bit in the downlink configuration index field and the short message indicator field, or the first predetermined bit field comprises 1 bit in a DCI format indicator field and 1 bit in the short message indicator field.

8. The method according to claim 6, further comprising:
based on the first type of paging control information being carried in the DCI, analyzing a second predetermined bit field, wherein the second predetermined bit field comprises N bits, wherein N>=3, and N is a positive integer.

9. The method according to claim 8, wherein the second predetermined bit field comprises higher N bits of a hybrid automatic repeat request (HARQ) process number indicator field or lower N bits of the HARQ process number indicator field.

10. The method according to claim 8, wherein the N bits in the second predetermined bit field are respectively configured to represent the system information update notification indicator, the ETWS notification indicator, and the CMAS notification indicator.

11. A non-transitory storage medium, storing computer instructions, wherein once the computer instructions are executed, a method for indicating paging control information is performed, wherein the method comprises:
determining whether a first type of paging control information and a second type of paging control information are to be carried, wherein the first type of paging control information comprises a system information update notification indicator, an earthquake and tsunami warning system (ETWS) notification indicator, and a commercial mobile alert service (CMAS) notification indicator, and the second type of paging control information comprises a paging message scheduling information indicator; and
configuring a first predetermined bit field in downlink control information (DCI) in accordance with a determined result, wherein the first predetermined bit field comprises 2 bits,
wherein a first bit in the first predetermined bit field is configured to indicate whether both the first type of paging control information and the second of paging control information are carried; and
based on only one of the first type of paging control information and the second type of paging control information being carried, a second bit in the first predetermined bit field is configured to indicate which paging control information is carried.

12. The non-transitory storage medium according to claim 11, wherein the first predetermined bit field is obtained by extending a short message indicator field; or the first predetermined field comprises a downlink configuration index field; or the first predetermined bit field comprises 1 bit in the downlink configuration index field and the short message indicator field, or the first predetermined bit field comprises 1 bit in a DCI format indicator field and 1 bit in the short message indicator field.

13. The non-transitory storage medium according to claim 11, wherein based on the first type of paging control information being carried, the method further comprises:
configuring a second predetermined bit field in the DCI, wherein the second predetermined bit field comprises N bits, wherein N>=3, and N is a positive integer.

14. The non-transitory storage medium according to claim 13, wherein the second predetermined bit field comprises higher N bits of a hybrid automatic repeat request (HARQ) process number indicator field or lower N bits of the HARQ process number indicator field.

15. The non-transitory storage medium according to claim 13, wherein the N bits in the second predetermined bit field are respectively configured to indicate the system information update notification indicator, the ETWS notification indicator, and the CMAS notification indicator.

* * * * *